(12) United States Patent
Chen

(10) Patent No.: US 8,905,214 B2
(45) Date of Patent: Dec. 9, 2014

(54) ELECTRIC HUB UNIT

(75) Inventor: Chun-Hsung Chen, Taichung Hsien (TW)

(73) Assignee: Joy Industrial Co., Ltd., Taichung Hsien (TW)

( * ) Notice: Subject to any disclaimer, the term of this patent is extended or adjusted under 35 U.S.C. 154(b) by 165 days.

(21) Appl. No.: 13/571,551

(22) Filed: Aug. 10, 2012

(65) Prior Publication Data

US 2014/0041983 A1 Feb. 13, 2014

(51) Int. Cl.
*F16D 41/30* (2006.01)
*B62M 6/65* (2010.01)

(52) U.S. Cl.
USPC .......... 192/64; 180/206.6; 180/220; 310/67 A

(58) Field of Classification Search
USPC ............... 192/64; 180/206.4, 206.5, 206.6; 310/67 A
See application file for complete search history.

(56) References Cited

U.S. PATENT DOCUMENTS

| | | | |
|---|---|---|---|
| 2003/0042101 A1* | 3/2003 | Juan ................................ | 192/64 |
| 2005/0139443 A1* | 6/2005 | Chen ............................... | 192/64 |
| 2013/0015009 A1* | 1/2013 | Lin et al. ....................... | 180/220 |

* cited by examiner

*Primary Examiner* — Rodney H Bonck
(74) *Attorney, Agent, or Firm* — Rosenberg, Klein & Lee

(57) ABSTRACT

An electric hub unit includes a hub composed of first casing and a second casing. An electric unit is located between the first and second casings. An axle extends through two respective centers of the first and second casings. The first casing has a reception recess defined in one side thereof. A first extension and a second extension extend axially from the first casing and toward in opposite directions. A bearing is located in the inside of the second extension. A socket unit has a tubular portion and a ratchet unit is connected to the socket unit. The socket unit is mounted to outside of the first casing, and a bearing and a plate are located between the tubular portion and the first extension. The hub unit prevents water and foreign objects from entering into the hub.

7 Claims, 5 Drawing Sheets

ELECTRIC HUB UNIT

FIELD OF THE INVENTION

The present invention relates to an electric hub unit, and more particularly, to an electric hub unit with an improved arrangement between the sleeve and the hub to prevent foreign objects from entering the hub unit.

BACKGROUND OF THE INVENTION

The electric bicycles are developed to correspond the environmental issues and reduce carbon generated which contaminates the environment. The conventional electric bicycles comprise an electric device which drives the bicycle forward. Also, the conventional electric bicycles can be operated electrically and manually.

Generally, the electric device is installed to the rear wheel hub and the hub is connected with a chain on one end thereof so as to provide the flexibility of operations by either electric power or manual power.

Taiwan Utility Application No. 087206708 discloses a fixed axle with an active gear connected to the axle and the active gear is driven by a first driving unit cooperated with an electro-magnetic driving member. A toothed ring is pivotably connected to the axle. A planet gear unit is connected to the active gear and located between the active gear and the toothed ring. The planet gear unit is rotated about the active gear and drive the toothed ring. A driving part drives the wheel. A second driving unit is a one-way driving unit and located between the driving part and the toothed ring which drive the driving part in one direction. The driving part is freely rotated while the toothed ring is not driven.

Taiwan Utility Application No. 092121507 discloses an axle connected to the bicycle frame and two protrusions protrude from the outer periphery of the axle. A casing is mounted to the outside of the axle. Two bearings are cooperated with the axle which is rotated smoothly. A generating device is located between the axle and the casing and generates power by the relative rotational movement between the casing and the axle. The gear cluster is connected to the first side of the casing and cannot rotate backward. A freewheel is connected to the casing and transfers the forward force to the bicycle.

The electro-magnetic driving member of Taiwan Utility Application No. 087206708 is securely connected to the axle and located on one side of the driving part (casing). The driving force from the electro-magnetic device is transferred to the active gear via the first driving unit and the driving force then is transferred to the toothed ring via the planet gear unit. The toothed ring transferred the driving force to the driving part via the one-way second driving unit. The driving part is individually rotated while the toothed ring and the planet gear unit are not driven. Taiwan Utility Application No. 092121507 installs the generating device between the casing and the axle. The flywheel is connected to the first side of the casing and cooperated with the gear cluster connected with a chain to drive the casing. The generating device of Taiwan Utility Application No. 092121507 is located within the casing, nevertheless, there is no bearing located between the flywheel and the cover. Besides, the sealing feature between the flywheel and the cover is poor so that the water easily enters into the inside of the generating device.

The present invention intends to provide an improved electric hub unit for bicycles and improves the shortcomings of the conventional electric hub units.

SUMMARY OF THE INVENTION

The present invention relates to an electric huh unit and comprises a hub composed of first casing and a second casing. An electric unit is located between the first and second casings. An axle extends through two respective centers of the first and second casings. The first casing has a reception recess defined in one side thereof and multiple notches are defined in the inner periphery of the reception recess. A first extension and a second extension extend axially from the first casing and toward in opposite directions. A bearing is located in the inside of the second extension. A socket unit has a tubular portion which has a stepped portion extending radially from outside of the tubular portion. A ratchet unit has a base and a ratchet ring, wherein the base is located to the stepped portion and has multiple pawls. The ratchet ring has multiple teeth which are located corresponding to the notches. The ratchet ring has multiple ratchet teeth defined in the inner periphery thereof. The ratchet ring is located in the reception recess. The teeth are engaged with the notches. The socket unit is mounted to outside of the first casing and mounted to the axle. The pawls are engaged with the ratchet teeth. A bearing and a plate are located between the stepped portion of the tubular portion and the first extension.

The primary object of the present invention is to provide an electric hub unit which comprises a hub composed of first casing and a second casing. The first casing has a reception recess defined in the first side thereof and a first extension extends outward from the first side. The first casing has a second extension extending inward from the second side thereof. The ratchet unit of the socket unit is located in the reception recess and a first plate is located between the first extension and the tubular portion. A second plate is located in the inside of the socket unit and away from the first casing. By the first and second plates, water and foreign objects are prevented from entering the hub.

Another object of the present invention is to provide an electric hub unit wherein a bearing is located in the second extension of the first casing and the bearing is cooperated with two bearings in the tubular portion of the socket unit to support the axle.

Yet another object of the present invention is to provide an electric hub unit wherein the first casing has multiple ribs on the inside thereof to reinforce the strength of the first casing.

A further object of the present invention is to provide an electric hub unit wherein a ratchet unit is connected to the socket unit and has multiple pawls. A positioning member is connected to the base of the ratchet unit and contacts the pawls to position the pawls.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
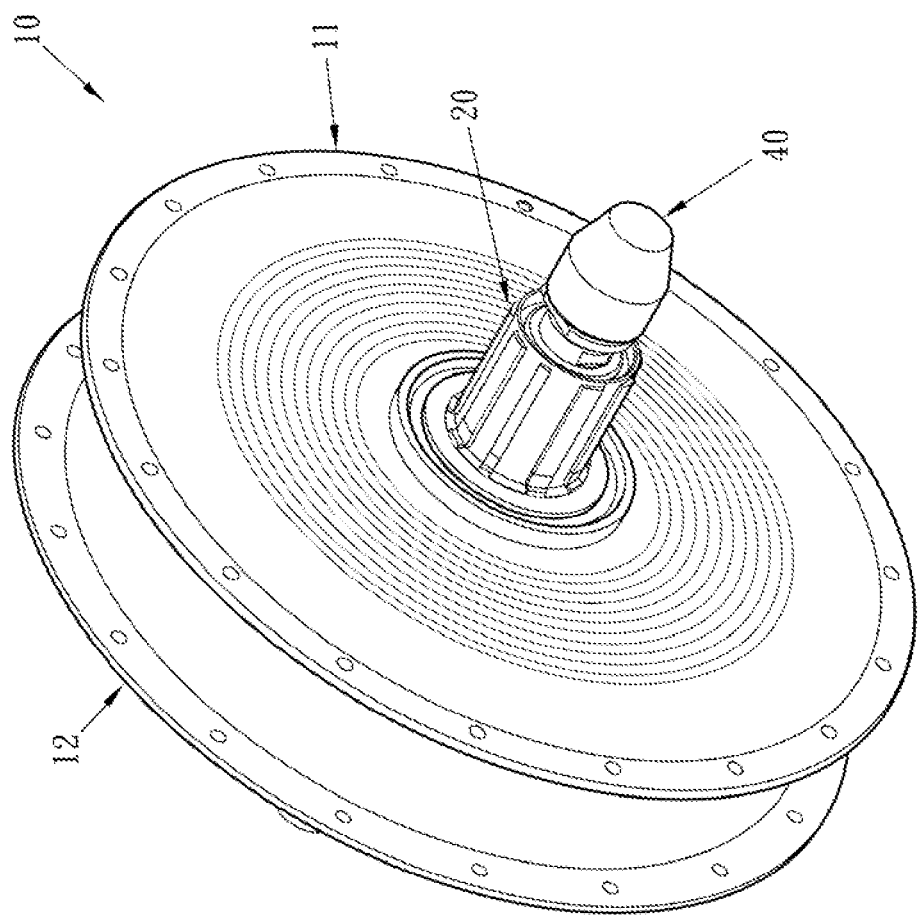
FIG. 1 is a perspective view to show the electric hub unit of the present invention.
Figure 2:
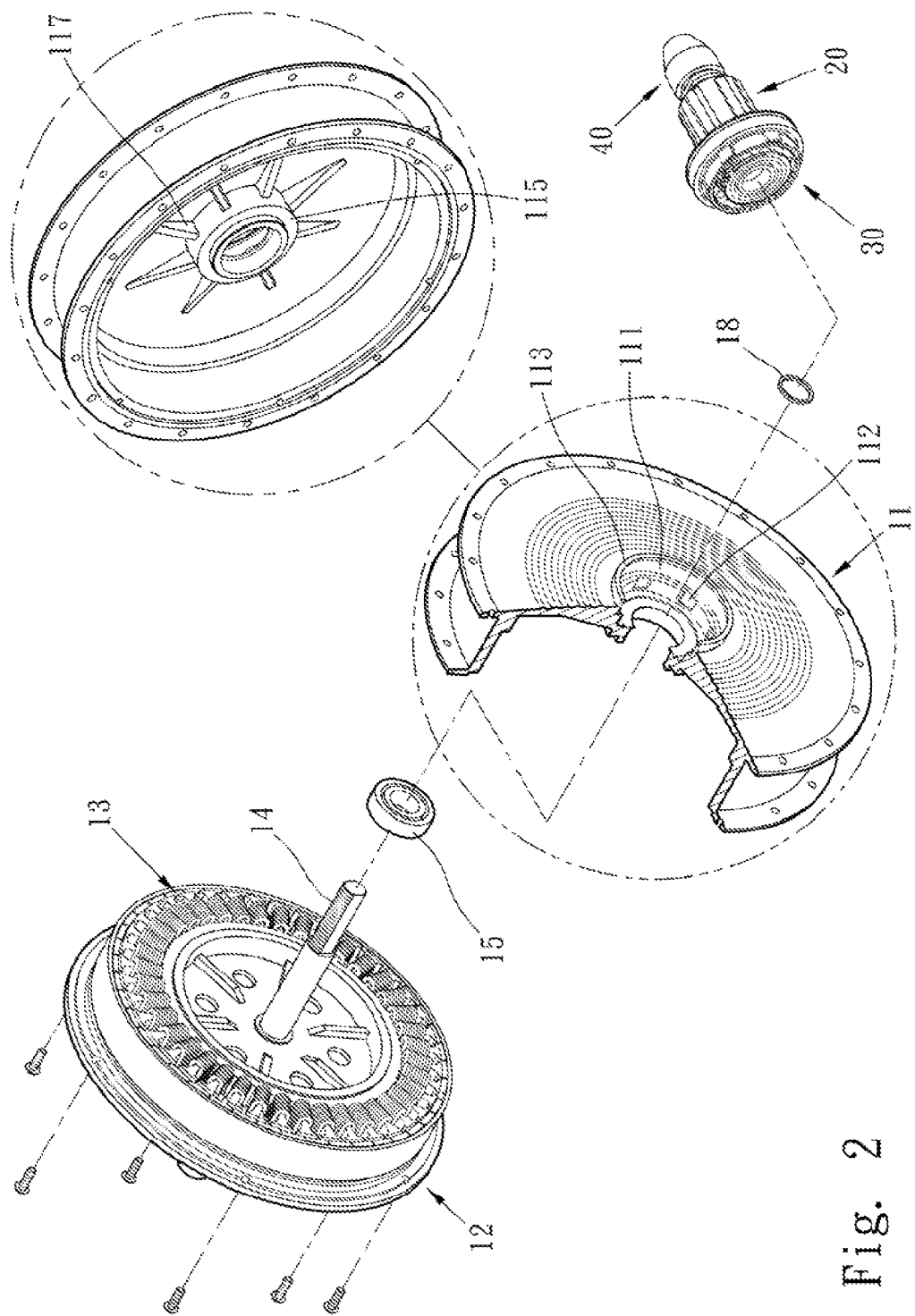
FIG. 2 is an exploded view to show the electric hub unit of the present invention.
Figure 3:
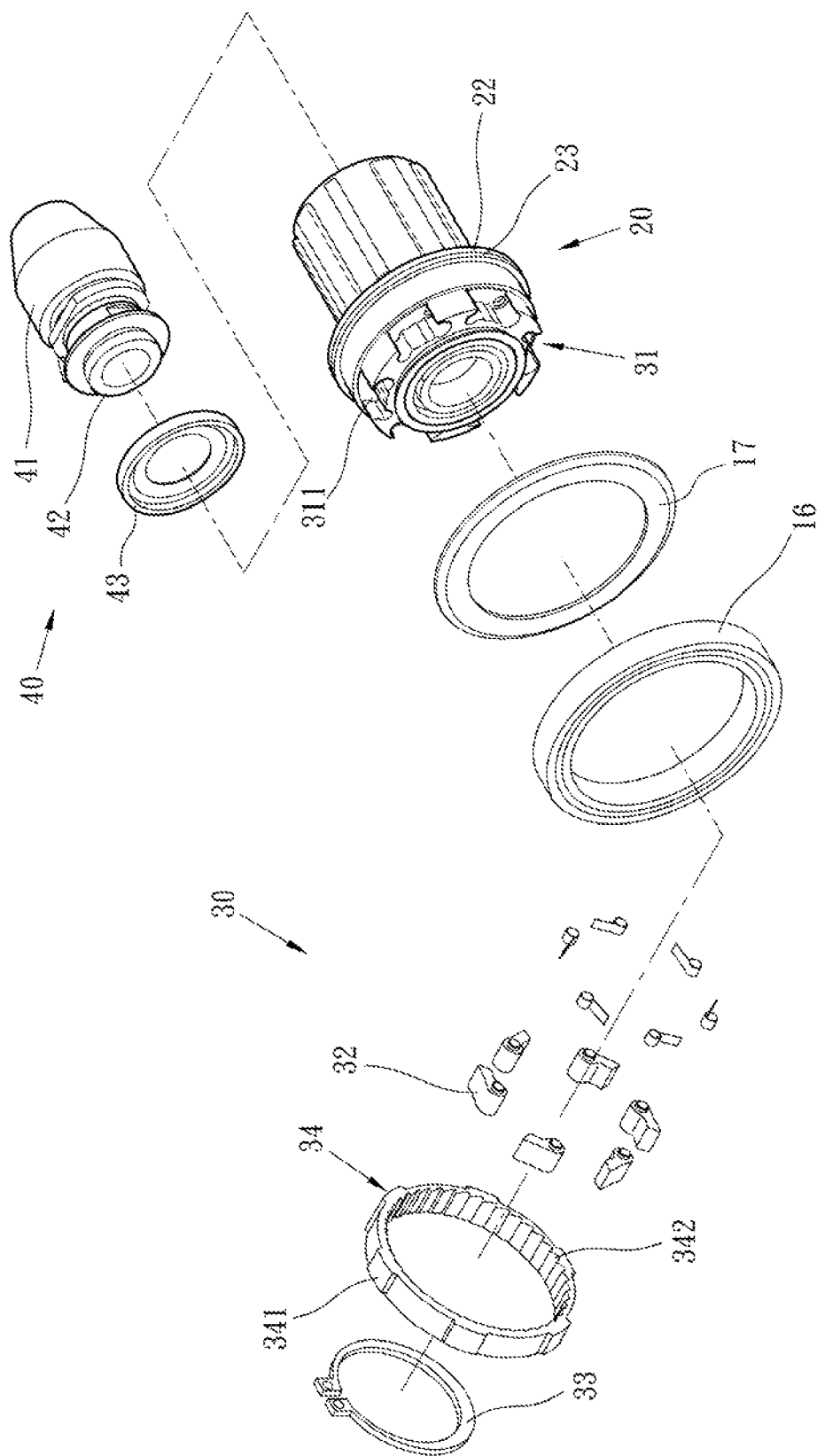
FIG. 3 is another exploded view to show the electric hub unit of the present invention.
Figure 4:
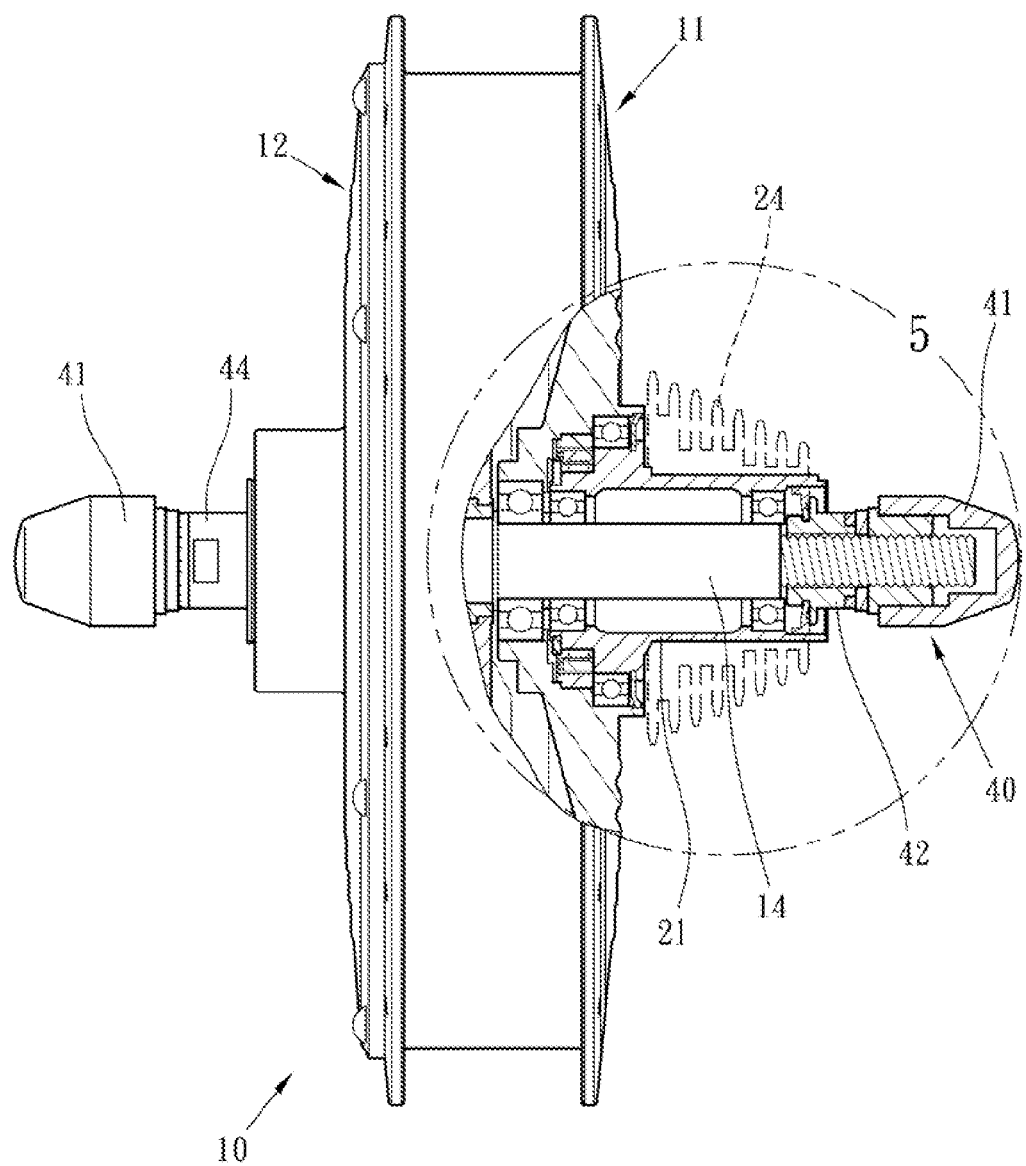
FIG. 4 is a partial cross sectional view to show the electric hub unit of the present invention.
Figure 5:
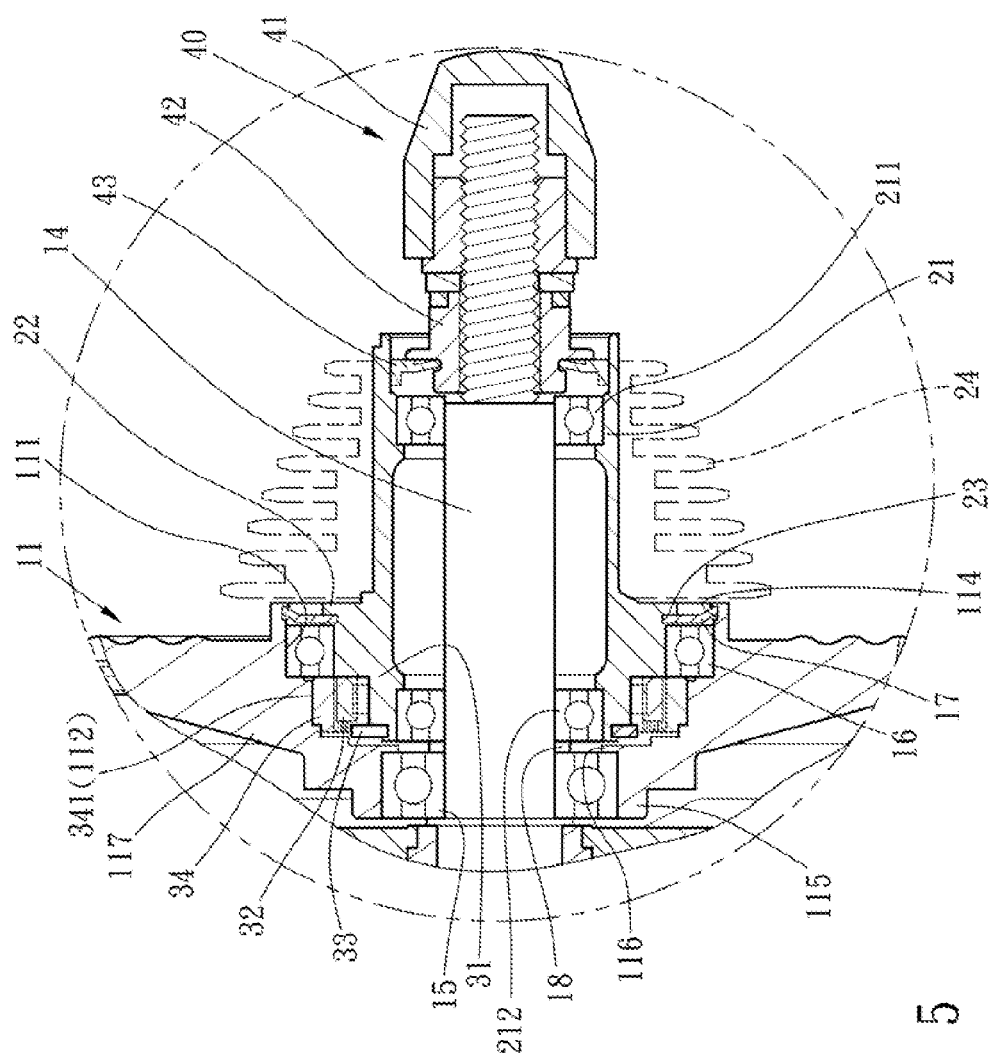
FIG. 5 is an enlarged cross sectional view to show the electric hub unit of the present invention.

Referring to FIGS. 1 to 5, the electric hub unit of the present invention comprises a hub 10, a socket unit 20 connected to one side of the hub 10, a ratchet unit 30 and two securing units 40.

The hub 10 is a hollow hub and composed of first casing 11 and a second casing 12. An electric unit 13 for providing electric, power is located between the first and second casings 11, 12. An axle 14 extends through two respective centers of the first and second casings 11, 12. The first casing 11 has a reception recess 111 defined in one side thereof and multiple notches 112 are defined in the inner periphery of the reception recess 111. A tubular first extension 113 extends from the first casing 11 and along the axis of the reception recess 111. A groove 114 is defined in the inner periphery of the first extension 113. A tubular second extension 115 extends from the first casing 11 and along the axis of the reception recess 111. The first and second extensions 113, 115 extend toward in opposite directions. A stop 116 extends inward and radially from the inner periphery of the second extension 115. A bearing 15 is located in the inside of the second extension 115 and contacts one side of the stop 116. The first casing 11 has multiple ribs 117 extending radially from the inner periphery thereof and located around the second extension 1115. Each of the ribs 117 has a thickness which is gradually narrowed toward the direction away from the second extension 115.

The socket unit 20 has a tubular portion 21 and two bearings 211, 212 are located in two inner sides of the tubular portion 21. A stepped portion 22 extends radially from outside of the tubular portion 21 and a positioning slot 23 is defined radially in the stepped portion 22. The tubular portion 21 further has a sprocket unit 24 mounted thereto so as to drive the socket unit 20, and the sprocket unit 24 is a gear cluster.

The ratchet unit 30 has a base 31, multiple pawls 32 and a ratchet ring 34, wherein the base 31 is integrally formed on one side of the socket unit 20 located adjacent to the stepped portion 22 and has multiple engaging recesses 311 with which the pawls 32 are received. The base 31 has a positioning member 33 which contacts the pawls 32 to prevent the pawls 32 from disengaging from the engaging recesses 311. In this embodiment, the positioning member 33 is a C-shaped clip. The ratchet ring 34 has multiple teeth 341 which are located corresponding to the notches 112. The ratchet ring 34 has multiple ratchet teeth 342 defined in the inner periphery thereof. The ratchet ring 34 is located in the reception recess 111 and the teeth 341 are engaged with the notches 112. The socket unit 20 is mounted to outside of the first casing 11 and mounted to the axle 14. The pawls 32 engaged with the ratchet teeth 342 so as to co-rotate the ratchet ring 34 and the hub 10. A bearing 16 and a ring-shaped first plate 17 are located between the stepped portion 22 of the tubular portion 21 and the first extension 113. The inner and outer portions of the first plate 17 are respectively engaged with the positioning slot 23 and the groove 114. By the first plate 17, water and foreign objects can be prevented from entering the hub 10. A washer 18 is mounted to the axle 14 and located between the bearing 15 in the second extension 115 and the bearing 212.

The two securing units 40 are connected to two ends of the axle 14 and each securing unit 40 has a locking member 41 and a contact part. A first contact part 42 is located between the locking member 41 on one side of the first casing 11 and the tubular portion 21. By locking the locking member 41, the first contact part 42 contacts one end of the bearing 211. A second plate 43 is located between the first contact part 42 and the inner periphery of the tubular portion 21 to prevent water from entering the tubular portion 21. A second contact part 44 is located between the locking member 41 and the second casing 12. The second contact part 44 contacts the second casing 12. The first and second contact parts 42, 44 are adapted to be connected with seat stays of a bicycle.

When assembling, the first and second casings 11, 12 are connected to each other to form the hub 10, and the axle 14 extends through the center of the hub 10. The ratchet unit 30 on one end of the socket unit 20 is installed in the reception recess 111 of the first casing 11 and the sprocket unit 24 is mounted to the tubular portion 21. The securing units 40 are then fixed to the two ends of the axle 14 to finish the assembly.

The tubular first extension 113 extends from the first casing 11 and along the axis of the reception recess 111 and the tubular second extension 115 extends from the first casing 11 and along the axis of the reception recess 111. The first and second extensions 113, 115 extend toward in opposite directions. The rig-shaped first plate 17 is located between the stepped portion 22 of the tubular portion 21 and the first extension 113. The washer 18 is mounted to the axle 14 and located between the bearing 15 in the second extension 115 and the bearing 212. The first and second plates 17, 43 prevent water and foreign objects from entering the tubular portion 21. The second extension 115 has the bearing 15 which is cooperated with the bearings 211, 212 in the tubular portion 21 to allow the axle 14 rotate smoothly.

The multiple ribs 117 extend radially from the inner periphery of the first casing 11 and are located around the second extension 115 so as to reinforce the strength of the hub 10. The ratchet unit 31 located on the tubular portion 21 is cooperated with the pawls 32, and the positioning member 33 contacts the pawls 32 to well position the pawls 32.

The first casing 11 has a reception recess 111 defined, in the first side thereof and the first and second extensions 113, 115 extend in opposite directions from the first casing 11. The socket unit 20 is located in the reception recess 111 and the first plate 17 is located between the first extension 113 and the tubular portion 21 to prevent water and foreign objects from entering the hub. The bearing 15 located in the second extension 115 and the axle 14 to allow the axle 14 to rotate smoothly.

While we have shown and described the embodiment in accordance with the present invention, it should be clear to those skilled in the art that further embodiments may be made without departing from the scope of the present invention.

What is claimed is:

1. An electric hub unit comprising:
    a hub being a hollow hub and composed of first casing and a second casing, an electric unit located between the first and second casings, an axle extending through two respective centers of the first and second casings, the first casing having a reception recess defined in one side thereof and multiple notches defined in an inner periphery of the reception recess, a first extension and a second extension extending axially from the first casing and outward in opposite directions, a bearing located in an inside of the second extension;
    a socket unit having a tubular portion which has a stepped portion extending radially from outside of the tubular portion; and
    a ratchet unit having a base and a ratchet ring, the base being located adjacent to the stepped portion and having multiple pawls, the ratchet ring having multiple teeth which are located corresponding to the notches, the ratchet ring having multiple ratchet teeth defined in an inner periphery thereof, the ratchet ring located in the reception recess, the teeth engaged with the notches, the socket unit mounted to an outer side of the first casing and mounted adjacent to said first casing on the axle, the pawls engaged with the ratchet teeth, a bearing and a first plate located between the stepped portion of the tubular portion and the first extension;

wherein the first casing has multiple ribs extending radially from the inner periphery thereof and located around the second extension, each of the ribs has a thickness which is narrowed toward a direction away from the second extension.

2. The electric hub unit as claimed in claim 1, wherein said multiple notches are defined axially in the inner periphery of the reception recess, said first extension is a tubular first extension extending axially from the first casing and a groove is defined in an inner periphery of the first extension, the stepped portion of the tubular portion has a positioning slot defined radially therein, said first plate is a ring-shaped first plate located between the groove and the positioning slot, said second extension is a tubular second extension extending axially from the first casing and toward a direction opposite to that of the first extension, a stop extends inward and radially from an inner periphery of the second extension, the bearing is located in the inside of the second extension and contacts one side of the stop.

3. The electric hub unit as claimed in claim 1, wherein the tubular portion has a sprocket unit mounted thereto so as to drive the socket unit.

4. The electric hub unit as claimed in claim 1, wherein the base is integrally formed with the stepped portion and has multiple engaging recesses defined radially therein, the pawls are located in the engaging recesses, the base has a positioning member which contacts the pawls.

5. The electric hub unit as claimed in claim 4, wherein the positioning member is a C-shaped clip.

6. The electric hub unit as claimed in claim 1, wherein two socket mounting bearings are located in the tubular portion of said socket unit; and a washer is mounted on the axle and located between the bearing in the second extension and a first socket mounting bearing of said two socket mounting bearings located close to the reception recess.

7. The electric hub unit as claimed in claim 1, wherein first and second securing units are oppositely connected to two ends of the axle, said first securing unit has a first locking member and a first contact part and said second securing unit has a second locking member and a second contact part, said first contact part is located between the first locking member located on one side of the first casing and the tubular portion, the first contact part contacts a socket mounting bearing in the tubular portion, a second plate is located between the first contact part and the tubular portion, said second contact part is located between the second locking member and the second casing, the second contact part contacts the second casing, the first and second contact parts are adapted to be connected with seat stays of a bicycle.

\* \* \* \* \*